US008305692B2

(12) United States Patent
Shimizu et al.

(10) Patent No.: US 8,305,692 B2
(45) Date of Patent: Nov. 6, 2012

(54) MACRO LENS (75) Inventors: Kaori Shimizu, Saitama (JP); Hisayuki Yamanaka, Saitama (JP)

(73) Assignee: Tamron Co., Ltd., Saitama (JP)

( * ) Notice: Subject to any disclaimer, the term of this patent is extended or adjusted under 35 U.S.C. 154(b) by 0 days.

(21) Appl. No.: 13/147,270

(22) PCT Filed: Feb. 5, 2010

(86) PCT No.: PCT/JP2010/051698
§ 371 (c)(1),
(2), (4) Date: Aug. 1, 2011

(87) PCT Pub. No.: WO2010/090281
PCT Pub. Date: Aug. 12, 2010

(65) Prior Publication Data
US 2011/0286116 A1 Nov. 24, 2011

(30) Foreign Application Priority Data
Feb. 5, 2009 (JP) .................................. 2009-025033

(51) Int. Cl.
*G02B 15/14* (2006.01)
(52) U.S. Cl. ........ 359/684; 359/683; 359/685; 359/686; 359/687; 359/715; 359/740; 359/773
(58) Field of Classification Search .......... 359/683–687, 359/715, 740, 773
See application file for complete search history.

(56) References Cited

U.S. PATENT DOCUMENTS

| | | | | | |
|---|---|---|---|---|---|
| 4,709,998 | A | * | 12/1987 | Yamanashi | 359/745 |
| 5,325,234 | A | * | 6/1994 | Yoneyama | 359/684 |
| 6,002,528 | A | * | 12/1999 | Tomita | 359/684 |
| 6,359,739 | B1 | | 3/2002 | Sensui | |
| 6,728,033 | B2 | * | 4/2004 | Hayakawa | 359/786 |
| 7,145,735 | B2 | * | 12/2006 | Harada | 359/686 |
| 2004/0017617 | A1 | | 1/2004 | Taki | |

FOREIGN PATENT DOCUMENTS

| | | |
|---|---|---|
| JP | 2001-272601 A | 10/2001 |
| JP | 2004-061680 A | 2/2004 |
| JP | 3538341 B2 | 3/2004 |
| JP | 2005-284101 A | 10/2005 |
| JP | 2006-153942 A | 6/2006 |

* cited by examiner

*Primary Examiner* — Evelyn A. Lester
(74) *Attorney, Agent, or Firm* — Jacobson Holman PLLC (57) ABSTRACT

The present invention is directed to an inner focusing macro lens that has a large aperture ratio as expressed by 2.5 or even smaller in F-number and still remains compact, and that is adapted to compensate for spherical aberration, astigmatism, and comatic aberration during photographing throughout the entire object distance ranging from infinity to proximity for an up to 1:1-magnification image. The inner focusing macro lens has the leading or first lens group of positive refractivity, the second lens group of negative refractivity, the third lens group of positive refractivity, and the trailing lens set succeeding to the third lens group in sequence from a position closest to an object being photographed. During focusing from a point infinitely far to that as proximal as desired, the first lens group is static while the second lens group is moved toward the imaging plane, and the third lens group is moved toward the object. The first lens group has at least four lens pieces of comprehensively positive refractivity and at least one lens piece of negative refractivity, and three of the lens pieces closest to the object in the first lens group are of positive refractivity.

5 Claims, 8 Drawing Sheets

MACRO LENS

This is a national stage of PCT/JP10/051698 filed Feb. 5, 2010 and published in Japanese, which claims the priority of Japanese number 2009-025033 filed Feb. 5, 2009, hereby incorporated by reference.

TECHNICAL FIELD

The present invention relates to a macro lens, and more particularly, to a macro lens suitable for photographing cameras, video cameras, electronic still cameras, and the like, and capable of photographing at a widely varied object distance ranging from infinity to proximity up to an equi- or 1:1-magnification image focusing range.

BACKGROUND ART

Focusing systems employed in the prior art macro lenses are well known, including a leading lens displacement system or a front focusing system where the foremost group of lens pieces closest to an object being photographed are to be moved for focusing, and an inner focusing system where some other lens group(s) other than the foremost lens group are to be moved for focusing.

The leading lens displacement system, namely, the front focusing system forces the largest and thus heavy lens group located the closest to the object being photographed to move during focusing. Thus, in a camera lens that is adapted to serve as a front focusing macro lens in combination with an automatic focusing mechanism, lens drive power for automatic focusing should be restricted, resulting in the front focusing macro lens encountering a difficulty in quick focusing.

In contrast, the inner focusing system, which forces a relatively lightweight lens group(s) other than the foremost lens group to move during focusing, is suitable to effecting the quick focusing. With the inner focusing system, however, unlike the leading lens displacement system or the front focusing system, the lens optics experiences a greater variation in aberrations in association with a varied object distance, especially, in spherical aberration. This kind of adverse effect tends to be more conspicuous for camera lenses of a greater aperture ratio.

The aforementioned is a primary reason why the prior art inner focusing macro lenses have an F-number as high as 2.8 or even greater. For instance, one exemplary macro lens capable of equi-magnification image focusing as disclosed in Document 1 in the following list of cited documents of the related art is a photographing lens of four groups of lens pieces in which a distance between principal points of the first and second lens groups is negative, and during focusing, the first lens group is static while the second lens group is moved toward the imaging plane, and the third lens group is moved toward the object so as to conduct themselves in a manner of so called 'floating'.

Such a macro lens is typically 50.0 to 60.0 mm in focal length, and 2.8 to 2.9 in F-number.

Another macro lens capable of equi-magnification image focusing as disclosed in Document 2 is a photographing lens of four groups of lens pieces, namely, the 1st lens group of positive power, the 2nd lens group of negative power, the 3rd lens group of positive power, and the 4th lens group of negative power in sequence from a position closest to the object being photographed, in which during focusing from infinity to proximity, the 1st lens group is static while the 2nd lens group is moved toward the imaging plane, and the 3rd lens group is moved toward the object so as to simultaneously meet requirements defined in the formulae as follows:

$$0.58 < sk/f < 0.70$$

$$0.65 < f34/f < 0.72$$

where sk is the shortest back focus from infinity to proximity, f is a focal length of the entire optics, and f34 is a composite focal length of the 3rd and 4th lens groups. The focal length is 62.4 mm, and the F-number is 2.9.

A macro lens capable of equi-magnification image focusing as disclosed in Document 3 includes a tele-photographing macro lens optics of four groups of lens pieces, namely, the 1st lens group of positive power, the 2nd lens group of negative power, the 3rd lens group of positive power, and the 4th lens group of negative power in sequence from a position closest to the object being photographed, in which during focusing from infinity to proximity, the 2nd lens group is moved toward the imaging plane while the 3rd lens group is moved toward the object so as to meet requirements defined in the formulae as follows:

$$3.7 < |f \times m/\Delta X3| < 9.9$$

where f is a focal length of the entire optics during photographing at infinity, m is a lateral magnification during photographing at the shortest object distance with a magnification of up to 1:1, $\Delta X3$ is a total displacement of the 3rd lens group for focusing from infinity to proximity. The focal length is 200 mm, and the F-number is 4.0.

LIST OF CITED DOCUMENTS OF THE RELATED ART

Patent Documents

Document 1 -Preliminary Publication of Unexamined Japanese Patent Application No. 2004-61680;
Document 2 -Preliminary Publication of Unexamined Japanese Patent Application No. 2006-153942; and
Document 3 -Japanese Patent No. 3538341.

SUMMARY OF THE INVENTION

Problem to be Solved by the Invention

The above-mentioned prior art inner focusing macro lenses, when designed in an attempt to increase an aperture ratio as expressed by 2.5 or even smaller in F-number, encounters a difficulty in appropriately compensating for spherical, astigmatism, and comatic aberrations throughout the entire object distance from infinity to proximity up to an equi- or 1:1-magnification image focusing range.

Means to Solve the Problem

The present invention is an inner focusing macro lens that has the leading or first lens group of positive refractivity, the second lens group of negative refractivity, the third lens group of positive refractivity, and the trailing lens set succeeding to the third lens group in sequence from a position closest to an object being photographed in which during focusing from infinity to proximity, the first lens group is static while the second lens group is moved toward the imaging plane, and the third lens group is moved toward the object;

the first lens group having at least four lens pieces of comprehensively positive refractivity and at least one lens piece of negative refractivity, and three of the lens pieces closest to the object in the first lens group being of positive refractivity.

Effect of the Invention

The inner focusing macro lens according to the present invention has a large aperture ratio as expressed by 2.5 or even smaller in F-number and still remains compact, and it is also adapted to restrain a variation in aberration, especially in spherical aberration, during photographing throughout the entire object distance from infinity to proximity up to an equi-magnification image focusing range.

The effect of the present invention will be described in more detail. In general, unless some special measures are taken, photographing lenses tend to suffer from undercorrected spherical aberration in focusing from infinity to proximity.

This is because, above all the photographing lenses, those which are capable of photographing at a very short object distance such as macro lenses cause axial beam flux incident upon their first lens group to be rapidly converged by positive lens pieces in the first lens group during focusing on the object considerably close in position. The lenses of the greater aperture ratio as in the present invention are more likely to suffer from the greatly varied spherical aberration in association with a variation in the object distance.

In the present invention, by virtue of the optical design where the first lens group has at least four positive lens pieces and at least a single negative lens piece, and three of the positive lens pieces located the closest to the object in the first lens group are of positive refractivity, the above-mentioned tendency of the undercorrected spherical aberration is diminished during image focusing to a proximal object, and moreover, by adopting a measure of the lens aperture ratio expressed by 2.5 or even smaller in F-number for converging the incident beam flux, the lens optics can still remain compact. The one ore more negative lens pieces in the first lens group work to appropriately compensate for the aberration caused by the positive lens pieces in the first lens group. Furthermore, by virtue of the optical design where the first lens group is static while the second lens group is moved toward the imaging plane, and the third lens group is moved toward the object being photographed during focusing from infinity to proximity, the present invention successfully attains an inner focusing macro lens capable of appropriately compensating for spherical, astigmatism, and comatic aberrations in photographed images throughout the entire object distance.

The present invention may be implemented in an exemplary manner as follows:

(A) The trailing lens set succeeding to the third lens group is of negative refractivity. Designed in this manner, the lens achieves effects of keeping its longitudinal dimension reduced and of reducing a displacement of the third lens group during focusing.

(B) The third lens group consists of a fore lens subset (L3A) of positive refractivity and a back lens subset (L3B) of positive refractivity, and during focusing from infinity to proximity, the back lens subset (L3B) in the third lens group is moved along with the fore lens subset (L3A), describing a trajectory curved in convexity with its apex faced to the imaging plane unlike the fore lens subset (L3A).

Designed in this manner, the lens can appropriately compensate for the spherical aberration during focusing to an intermediate range of the object distance.

(C) The macro lens of the present invention meets requirements defined in the following formulae:

$$0.5 \leq f1/f \leq 0.8 \quad (1)$$

where f is a focal length of the entire optics, and f1 is the focal length of the first lens group.

These are requirements for downsizing the inner focusing macro lens and appropriately compensating for the spherical, comatic, and astigmatism aberrations during focusing to proximity. f1/f smaller than the lower limit as defined in the formulae (1) is advantageous for reducing the dimensions of the lens optics but instead causes a difficulty in compensating for the spherical aberration. f1/f greater than the upper limit as defined in the formulae (1) is advantageous for compensating for the spherical aberration but instead leads to a difficulty in reducing the dimensions of the lens optics.

(D) In the inner focusing macro lens according to claim 1, the first lens group includes one or more cemented doublet lenses each of which is comprised of a positive lens piece having opposite convex surfaces and a negative lens piece joined with the positive lens piece in unit and having opposite concave surfaces, and the cemented doublet lens meets requirements defined in the following formulae:

$$0.2 \leq |Nd2 - Nd1| \quad (2)$$

$$35 \leq |vd1 - vd2| \quad (3)$$

where Nd1 is a refractive index of the positive lens piece of the cemented doublet lens, Nd2 is the refractive index of the negative lens piece of the cemented doublet lens, vd1 is an Abbe number of the positive lens piece of the cemented doublet lens, and vd2 is the Abbe number of the negative lens piece of the cemented doublet lens.

These requirements are for appropriately compensating for spherical aberration, longitudinal chromatic aberration, and chromatic aberration of magnification caused in the first lens group. When |Nd2−Nd1| is smaller than the lower limit given in the formula (2), the lens optics suffers from the undercorrected spherical aberration during focusing on a proximal object, and this leads to a difficulty in compensating for the spherical aberration. This also causes a trouble in compensating for the chromatic aberrations. |vd1−vd2| smaller than the lower limit given in the formula (3) causes a difficulty in compensating for the chromatic aberrations.

In another aspect, the present invention can be implemented in the following manner:

(a) The fourth lens group is static during focusing from infinity to proximity. Designed in this way, the macro lens has its lens barrel simplified in structure.

(b) The macro lens meets requirements as defined in the following formulae:

$$-0.5 \leq f2/f \leq -0.3 \quad (4)$$

where f is a focal length of the entire lens optics, and f2 is the focal length of the second lens group.

f2/f smaller than the lower limit given in the formulae (4) is advantageous in compensating for aberration but instead leads to a trouble of an increased displacement of the lens group during focusing which resultantly causes a failure to downsize the lens optics. f2/f greater than the upper limit given in the formulae (4) is advantageous in reducing the displacement of the lens group during focusing but instead diverges light beams transmitted through the second lens group, which necessitates increased dimensions of the third lens group. This also causes a difficulty in appropriately compensating for aberration developed in the first lens group.

(c) The foremost lens piece closest to the object in the third lens group is of positive refractivity. Designed in this manner, the macro lens attains an effect of converging the light beams that are otherwise diverged after transmitted through the second lens group, which resultantly effectively avoids increase in dimensions of the third lens group and the trailing lens set succeeding to the same.

In graphs illustrating aberrations in the accompanying drawings, EPH denotes a radius of an entrance pupil, and Y denotes the radius of an image circle. The chromatic aberration of magnification illustrated is that which is sampled at the g-line, and the remaining types of the aberration are sampled at the d-line. In the graphs of the astigmatism, solid line designates sagittal rays while broken line designates meridional rays. All the lengths are expressed in millimeters. The spherical aberration, the astigmatism, and the chromatic aberration of magnification are expressed in millimeters while the distortion aberration is in percentages.

BEST MODE TO IMPLEMENT THE INVENTION

Figure 1:
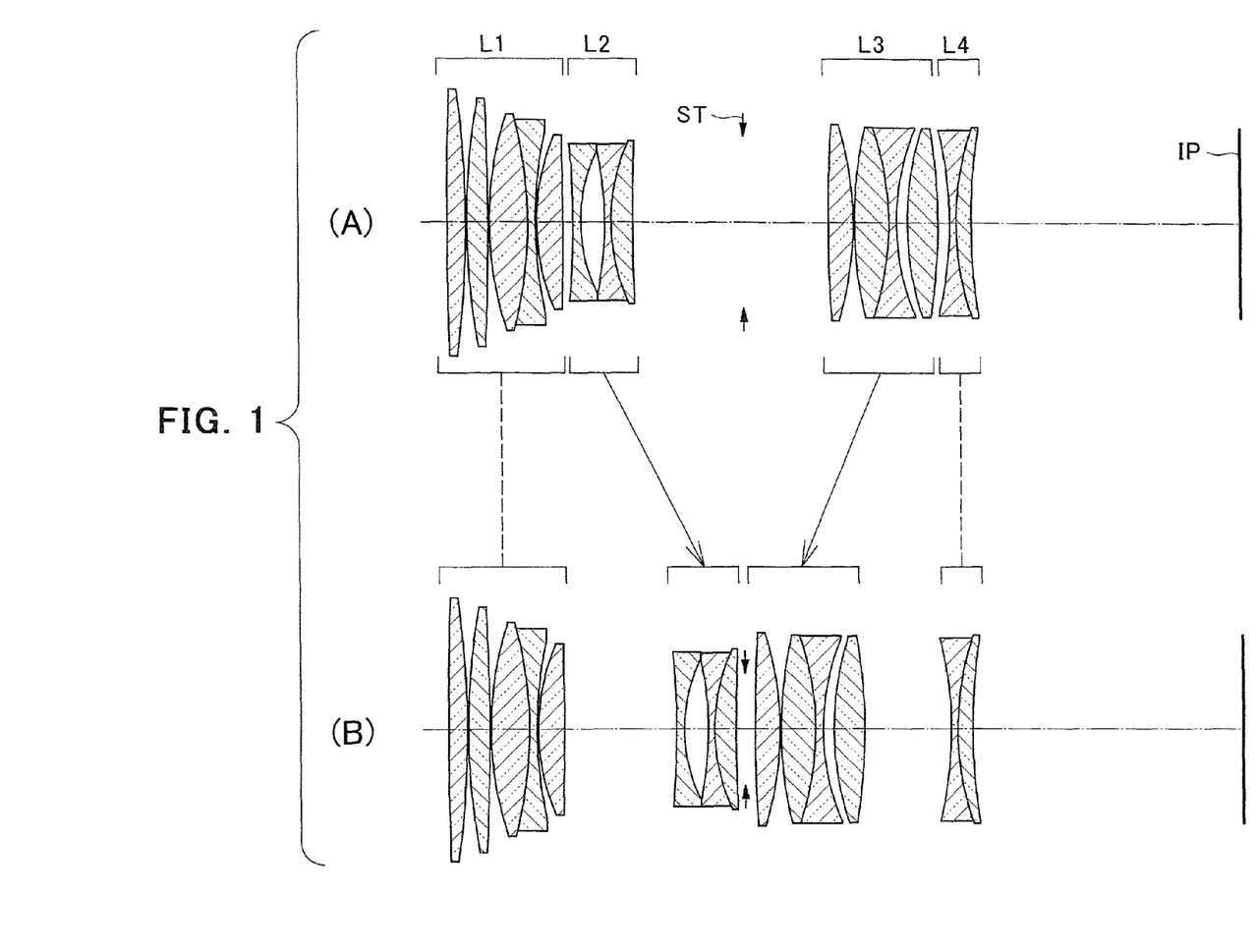
FIG. 1 is a cross sectional view illustrating optics of a first embodiment of an inner focusing macro lens; (A) depicts the optics deployed for infinitely far object distance while (B) depicts the optics deployed for equi- or 1:1-magnification image focusing.
Figure 2:
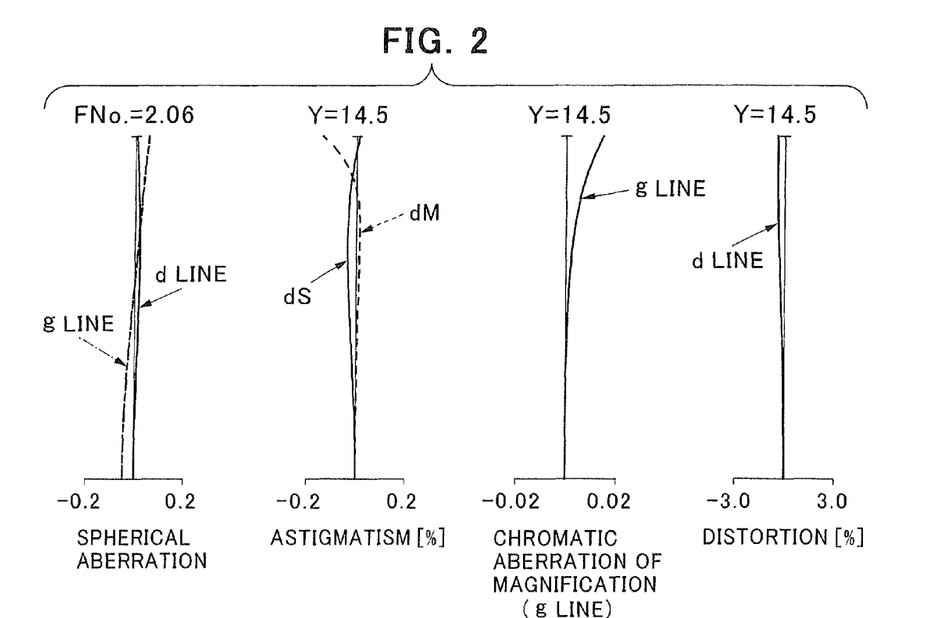
FIG. 2 is a diagram illustrating various types of aberrations caused in the first embodiment of the inner focusing macro lens posturing itself for focusing to infinity.
Figure 3:
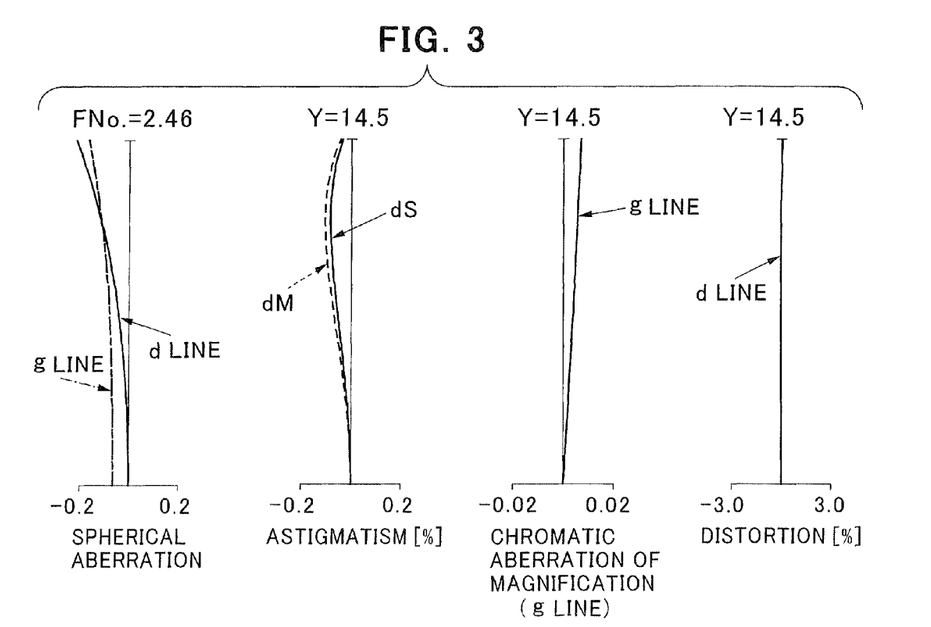
FIG. 3 is a diagram illustrating the various types of aberrations caused in the first embodiment of the inner focusing macro lens posturing itself at 5:1 magnification image focusing range.
Figure 4:
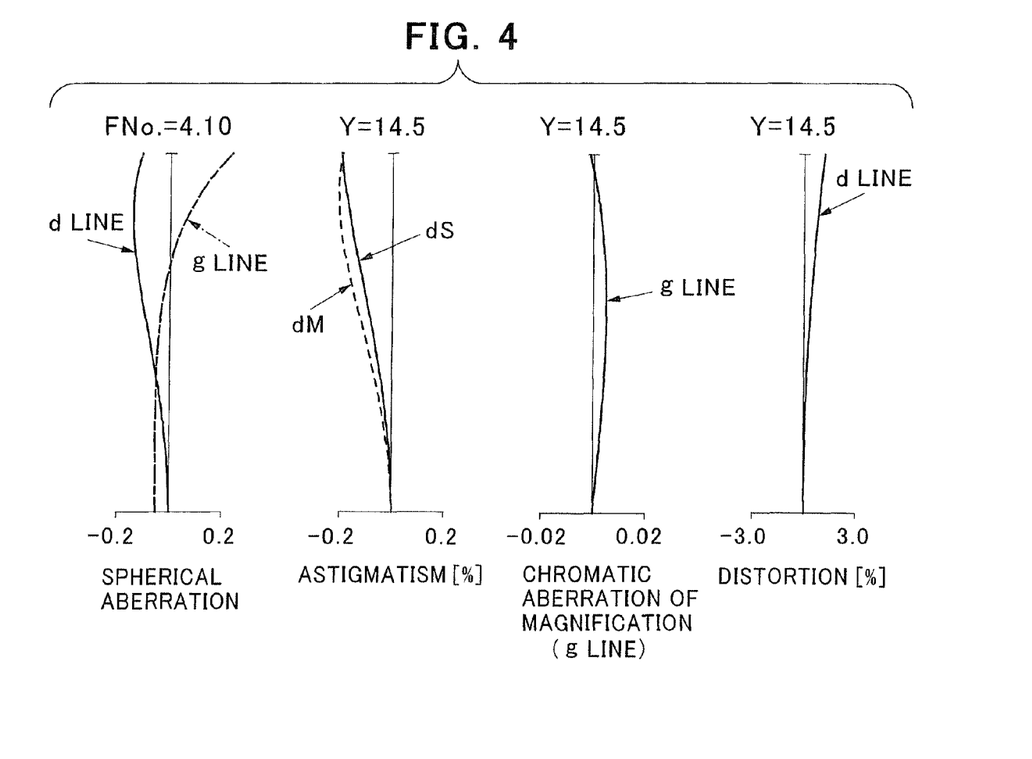
FIG. 4 is a diagram illustrating the various types of aberrations caused in the first embodiment of the inner focusing macro lens posturing itself at equi-magnification image focusing range.
Figure 5:
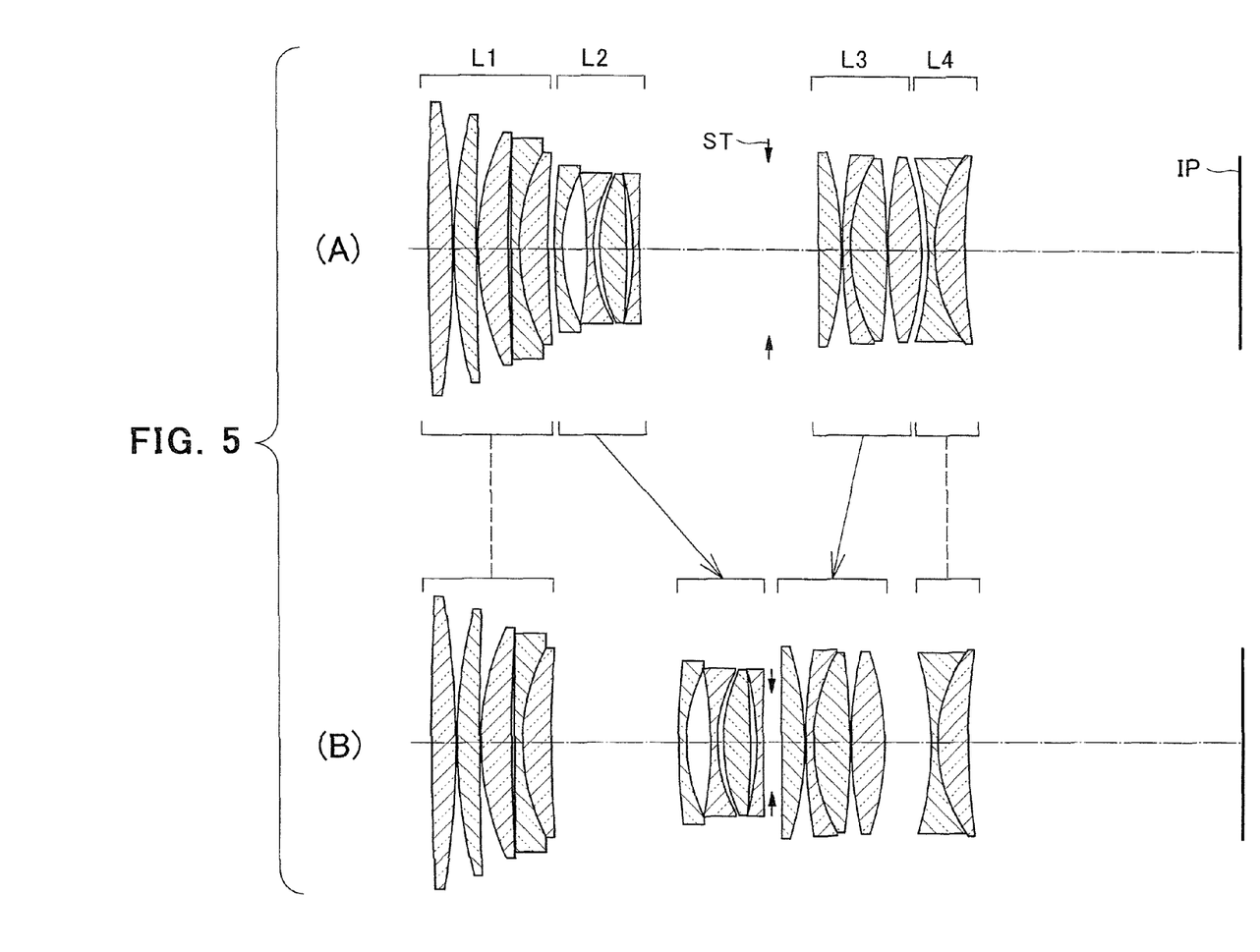
FIG. 5 is a cross-sectional view illustrating optics of a second embodiment of the inner focusing macro lens; (A) depicts the optics deployed for infinitely far object distance while (B) depicts the optics deployed for equi-magnification image focusing.
Figure 6:
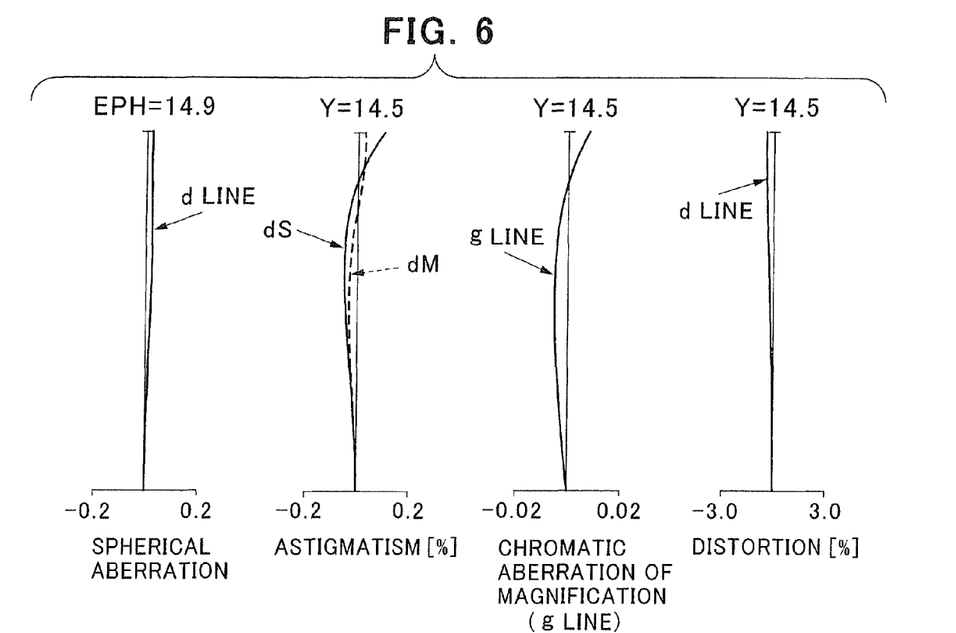
FIG. 6 is a diagram illustrating various types of aberrations caused in the second embodiment of the inner focusing macro lens posturing itself for focusing to infinity.
Figure 7:
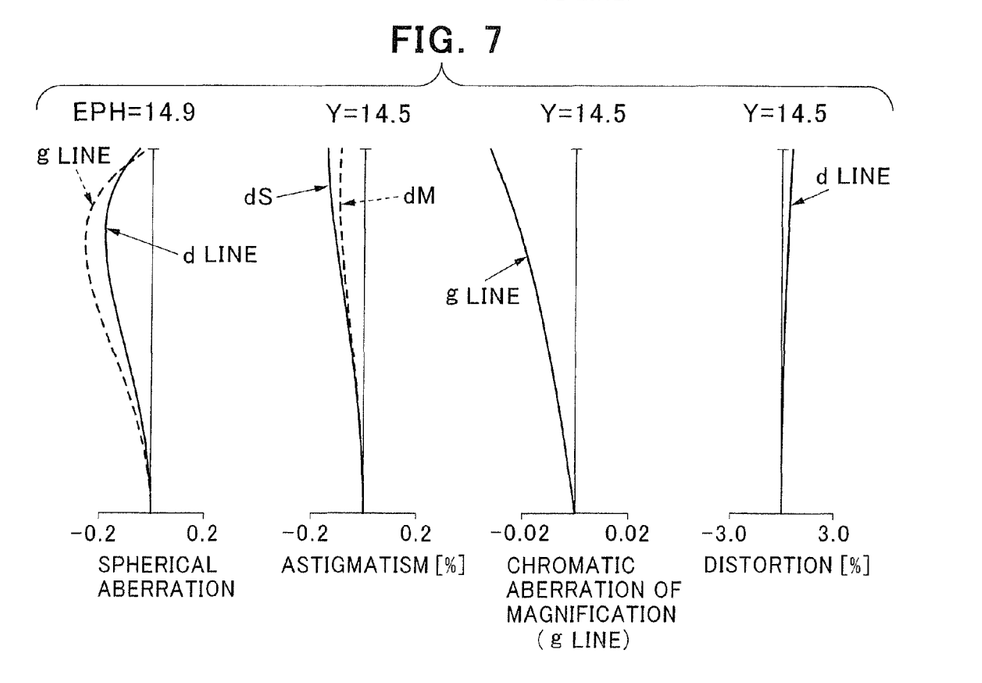
FIG. 7 is a diagram illustrating the various types of aberrations caused in the second embodiment of the inner focusing macro lens posturing itself at equi-magnification image focusing range.
Figure 8:
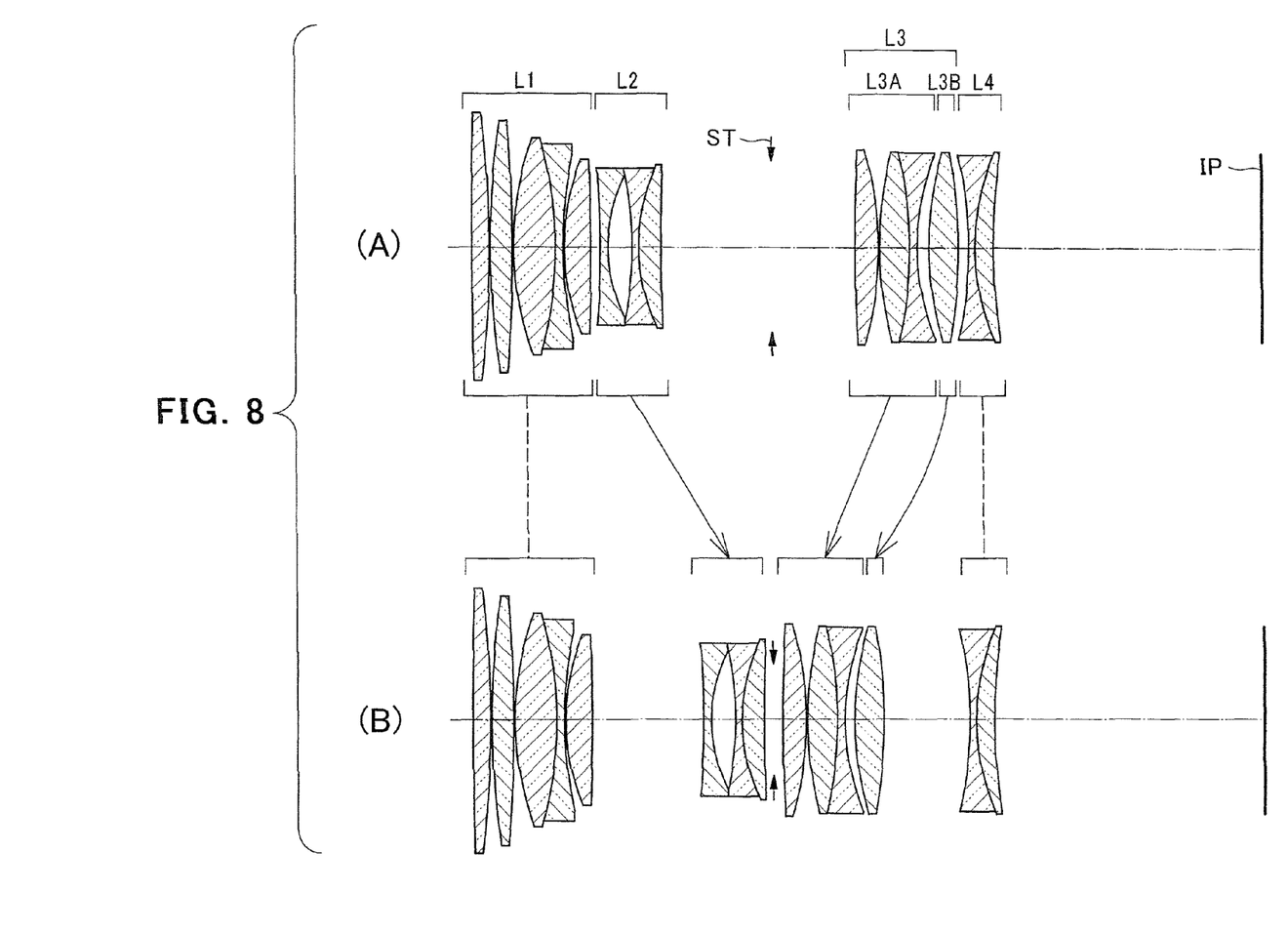
FIG. 8 is a cross sectional view illustrating optics of a third embodiment of the inner focusing macro lens; (A) depicts the optics deployed for infinitely far object distance while (B) depicts the optics deployed for equi-magnification image focusing.
Figure 9:
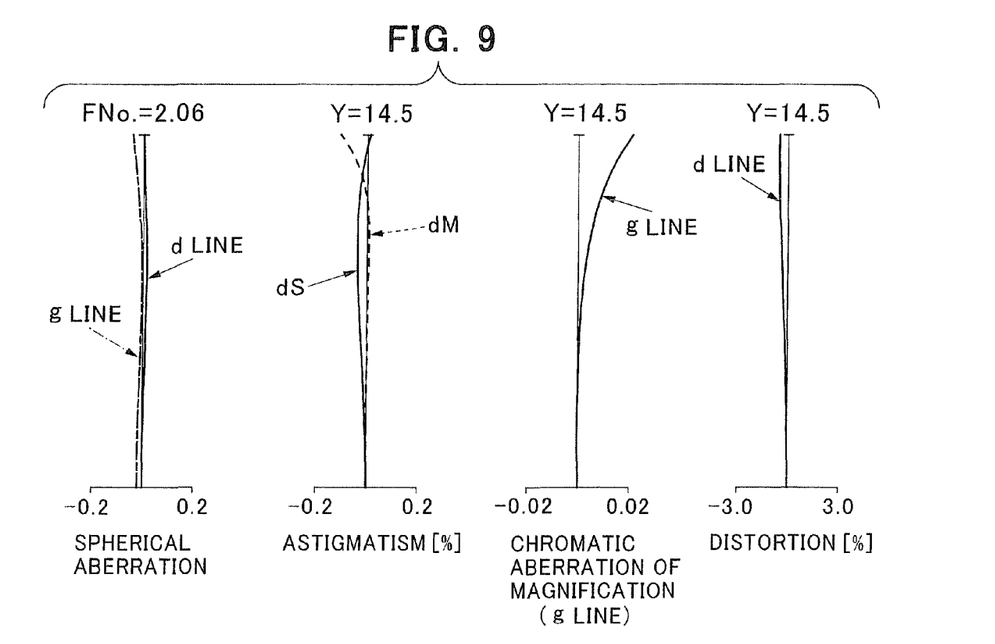
FIG. 9 is a diagram illustrating various types of aberrations caused in the third embodiment of the inner focusing macro lens posturing itself for focusing to infinity.
Figure 10:
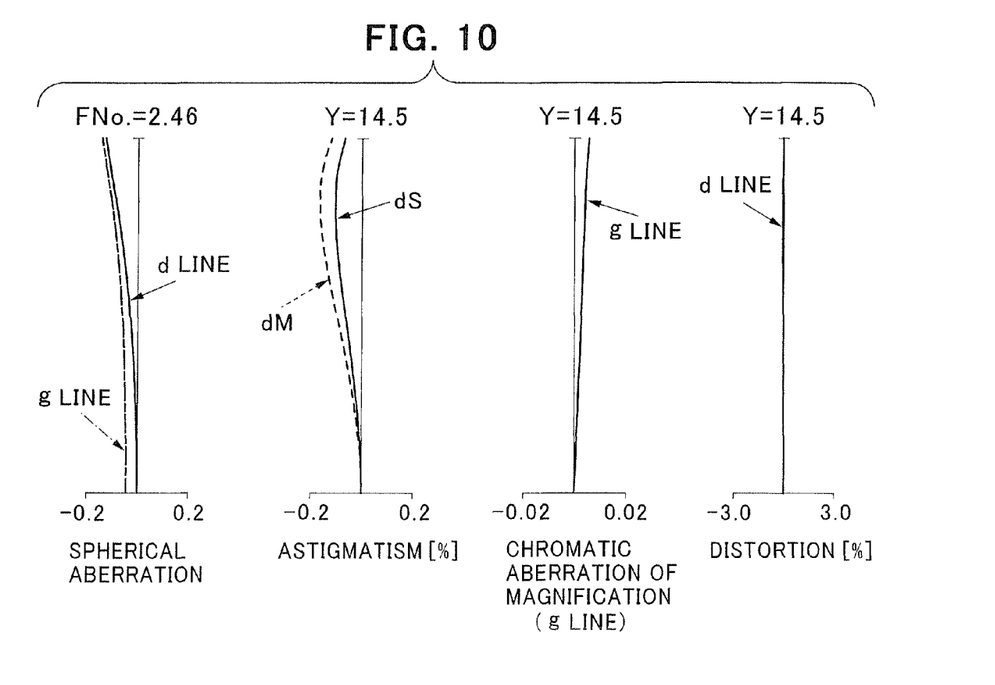
FIG. 10 is a diagram illustrating the various types of aberrations caused in the third embodiment of the inner focusing macro lens posturing itself at 5:1 magnification image focusing range.
Figure 11:
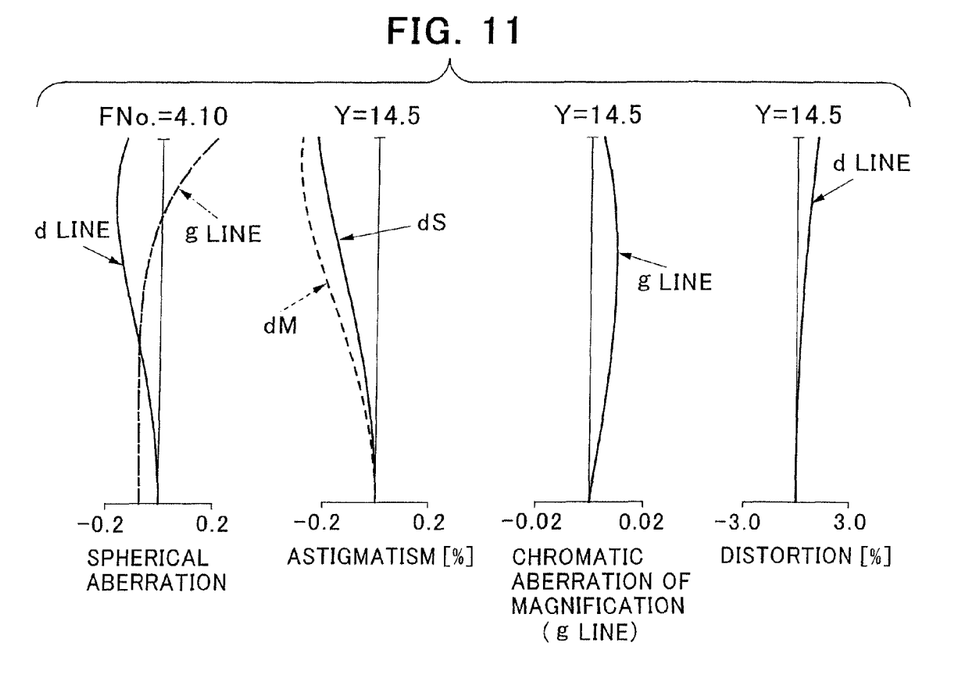
FIG. 11 is a diagram illustrating the various types of aberrations caused in the third embodiment of the inner focusing macro lens posturing itself at equi-magnification image focusing range.

In the following paragraphs where embodiments of the present invention will be detailed, f denotes a focal length, Fno is an F-number, 2ω is an angle of view)(°), N0 is a number of a surface, R is a radius of curvature, D is a distance between lens surfaces, Nd and vd designate a refractive index and an Abbe number, respectively, at the d-line. All the lengths are expressed in millimeters or mm although any other expressions may be used for unit of measurement.

Embodiment 1

| f = 61.5000 FNo. = 2.06 2ω = 26.6° | | | | |
|---|---|---|---|---|
| No. | R | D | Nd | vd |
| 1 | 607.1412 | 2.8588 | 1.80610 | 33.3 |
| 2 | −150.8774 | 0.2000 | | |
| 3 | 106.5613 | 3.2664 | 1.80610 | 40.9 |
| 4 | −386.7796 | 0.2000 | | |
| 5 | 52.1704 | 5.9043 | 1.49700 | 81.6 |
| 6 | −63.6877 | 1.2000 | 1.75520 | 27.5 |
| 7 | 63.6877 | 0.2000 | | |
| 8 | 33.3440 | 4.0301 | 1.49700 | 81.6 |
| 9 | −900.5149 | D(9) | | |
| 10 | −141.8233 | 1.2000 | 1.80400 | 46.6 |
| 11 | 24.1327 | 3.7206 | | |
| 12 | −53.8762 | 1.0000 | 1.51680 | 64.2 |
| 13 | 29.0865 | 3.3409 | 1.84666 | 23.8 |
| 14 | 243.7428 | D(14) | | |
| 15 | INF | D(15) | | |
| 16 | 229.9230 | 3.8620 | 1.69680 | 55.5 |
| 17 | −50.2559 | 0.2000 | | |
| 18 | 62.0642 | 5.3744 | 1.77250 | 49.6 |
| 19 | −44.0094 | 1.2000 | 1.72825 | 28.5 |
| 20 | 35.9734 | 1.6900 | | |
| 21 | 45.2188 | 4.7774 | 1.69680 | 55.5 |
| 22 | −88.5480 | D(22) | | |
| 23 | −58.5066 | 1.0000 | 1.54072 | 47.2 |
| 24 | 43.5528 | 2.3210 | 1.84666 | 23.8 |
| 25 | 88.0000 | | | |

| Varied Distance Between Surfaces | | | |
|---|---|---|---|
| | ∞ | Up to 5:1 Mag. | Up to 1:1 Mag. |
| f | 61.5000 | 65.1885 | 52.3578 |
| FNo. | 2.06 | 2.46 | 4.10 |
| D(9) | 1.5848 | 4.6948 | 17.4252 |
| D(14) | 17.2873 | 14.1774 | 1.4470 |
| D(15) | 13.2179 | 10.5905 | 1.5000 |
| D(22) | 1.8205 | 4.4479 | 13.5384 |

| Values of Terms in Conditional Formulae | |
|---|---|
| Formula (1) | f1/f = 0.65 |
| Formula (2) | | Nd2 − Nd1 | = 0.276 |
| Formula (3) | | vd1 − vd2 | = 54.1 |
| Formula (4) | f2/f = −0.40 |

Embodiment 2

| f = 61.5000 FNo. = 2.06 2ω = 26.5° | | | | |
|---|---|---|---|---|
| No. | R | D | Nd | vd |
| 1 | 440.6688 | 3.6941 | 1.71300 | 53.8 |
| 2 | −139.1139 | 0.2000 | | |
| 3 | 80.4222 | 3.4057 | 1.69680 | 55.5 |
| 4 | 559.9578 | 0.2000 | | |
| 5 | 41.0752 | 4.6664 | 1.69680 | 55.5 |
| 6 | 259.6353 | 0.4609 | | |
| 7 | 1284.0540 | 1.2000 | 1.78472 | 25.7 |
| 8 | 30.2238 | 4.3860 | 1.77250 | 49.6 |
| 9 | 175.0786 | D(9) | | |
| 10 | 104.2604 | 1.2000 | 1.77250 | 49.6 |
| 11 | 24.7276 | 3.7488 | | |
| 12 | −57.9805 | 1.0000 | 1.61272 | 58.8 |

-continued

| f = 61.5000 FNo. = 2.06 2ω = 26.5° | | | | |
|---|---|---|---|---|
| 13 | 22.0041 | 0.9339 | | |
| 14 | 26.3458 | 4.1293 | 1.84666 | 23.8 |
| 15 | −133.2816 | 0.9854 | | |
| 16 | −42.6266 | 1.0000 | 1.80610 | 33.3 |
| 17 | 508.8701 | D(17) | | |
| 18 | INF | D(18) | | |
| 19 | 2776.4246 | 3.5072 | 1.79952 | 42.2 |
| 20 | −48.9393 | 0.2000 | | |
| 21 | 80.8759 | 1.2000 | 1.78472 | 25.7 |
| 22 | 27.6346 | 5.5870 | 1.49700 | 81.6 |
| 23 | −111.9208 | 0.2000 | | |
| 24 | 60.7002 | 5.1241 | 1.49700 | 81.6 |
| 25 | −43.4654 | D(25) | | |
| 26 | −48.5519 | 1.0000 | 1.67270 | 32.1 |
| 27 | 23.3187 | 4.6792 | 1.84666 | 23.8 |
| 28 | 89.1954 | | | |

| Varied Distance Between Surfaces | | |
|---|---|---|
| | ∞ | Up to 1:1 Mag. |
| f | 61.5000 | 55.2183 |
| FNo. | 2.06 | 4.10 |
| D(9) | 1.0000 | 19.4981 |
| D(17) | 19.8528 | 1.3546 |
| D(18) | 7.6500 | 1.5000 |
| D(25) | 1.0037 | 7.1537 |

| Values of Terms in Conditional Formulae | |
|---|---|
| Formula (1) | f1/f = 0.65 |
| Formula (2) | | Nd2 − Nd1 | = 0.012 |
| Formula (3) | | νd1 − νd2 | = 23.9 |
| Formula (4) | f2/f = −0.35 |

Embodiment 3

| f = 61.5000 FNo. = 2.06 2ω = 26.6° | | | | |
|---|---|---|---|---|
| No. | R | D | Nd | νd |
| 1 | 768.0472 | 2.7025 | 1.84666 | 23.8 |
| 2 | −174.5025 | 0.2000 | | |
| 3 | 127.4427 | 3.4178 | 1.77250 | 49.6 |
| 4 | −240.3804 | 0.2000 | | |
| 5 | 47.3966 | 6.4926 | 1.49700 | 81.6 |
| 6 | −59.7182 | 1.2000 | 1.75520 | 27.5 |
| 7 | 64.1599 | 0.2000 | | |
| 8 | 34.5989 | 4.1418 | 1.49700 | 81.6 |
| 9 | −405.6511 | D(9) | | |
| 10 | −143.0085 | 1.2000 | 1.79952 | 42.2 |
| 11 | 23.6776 | 3.8090 | | |
| 12 | −50.7368 | 1.0000 | 1.51680 | 64.2 |
| 13 | 28.2461 | 3.4956 | 1.84666 | 23.8 |
| 14 | 330.4577 | D(14) | | |
| 15 | INF | D(15) | | |
| 16 | 261.3541 | 3.6860 | 1.77250 | 49.6 |
| 17 | −52.7176 | 0.2000 | | |
| 18 | 56.5729 | 4.6983 | 1.77250 | 49.6 |
| 19 | −63.2645 | 1.2000 | 1.76182 | 26.5 |
| 20 | 36.4947 | D(20) | | |
| 21 | 49.7242 | 4.6009 | 1.71300 | 53.9 |
| 22 | −82.0371 | D(22) | | |
| 23 | −62.0861 | 1.0000 | 1.60342 | 38.0 |
| 24 | 35.0991 | 2.8655 | 1.84666 | 23.8 |
| 25 | 89.9241 | | | |

| Varied Distance Between Surfaces | | | |
|---|---|---|---|
| | ∞ | Up to 5:1 Mag. | Up to 1:1 Mag. |
| f | 61.5000 | 65.4478 | 52.0543 |
| FNo. | 2.06 | 2.46 | 4.10 |
| D(9) | 1.4753 | 4.6241 | 17.4561 |
| D(14) | 17.3917 | 14.2429 | 1.4109 |
| D(15) | 13.0541 | 9.8539 | 1.5000 |
| D(20) | 1.8367 | 2.4671 | 1.5247 |
| D(22) | 1.6322 | 4.2020 | 13.4983 |

| Values of Terms in Conditional Formulae | |
|---|---|
| Formula (1) | f1/f = 0.66 |
| Formula (2) | | Nd2 − Nd1 | = 0.276 |
| Formula (3) | | νd1 − νd2 | = 54.1 |
| Formula (4) | f2/f = −0.40 |

DESCRIPTION OF THE REFERENCE ALPHANUMERICAL NUMBERS

| L1 | 1st Lens Group |
|---|---|
| L2 | 2nd Lens Group |
| L3 | 3rd Lens Group |
| L3A | Fore Lens Subset of the 3rd Lens Group |
| L3B | Back Lens Subset of the 3rd Lens Group |
| L4 | Trailing Lens Set |
| ST | Aperture Stop |
| IP | Imaging Plane |

The invention claimed is:

1. An inner focusing macro lens that has the leading or first lens group of positive refractivity, the second lens group of negative refractivity, the third lens group of positive refractivity, and the trailing lens set succeeding to the third lens group in sequence from a position closest to an object being photographed in which during focusing from a point infinitely far to that as proximal as desired, the first lens group is static while the second lens group is moved toward the imaging plane, and the third lens group is moved toward the object;

the first lens group having at least four lens pieces of comprehensively positive refractivity and at least one lens piece of negative refractivity, and three of the lens pieces closest to the object in the first lens group being of positive refractivity.

2. The inner focusing macro lens according to claim 1, wherein the trailing lens set is of negative refractivity.

3. The inner focusing macro lens according to claim 2, wherein the third lens group consists of a fore lens subset (L3A) of positive refractivity and a back lens subset (L3B) of positive refractivity, and during focusing from infinity to proximity, the back lens subset (L3B) in the third lens group is moved along with the fore lens subset (L3A), describing a trajectory curved in convexity with its apex faced to the imaging plane unlike the fore lens subset (L3A).

4. The inner focusing macro lens according to claim 2, wherein it meets requirements defined in the following formulae:

$$0.5 \leq f1/f \leq 0.8 \quad (1)$$

where f is a focal length of the entire lens optics, and f1 is the focal length of the first lens group.

5. The inner focusing macro lens according to claim 4, wherein the first lens group includes one or more cemented doublet lenses each of which is comprised of a positive lens piece having opposite convex surfaces and a negative lens piece joined with the positive lens piece in unit and having opposite concave surfaces, and the cemented doublet lens meets requirements defined in the following formulae:

$$0.2 \leq |Nd2 - Nd1| \quad (2)$$

$$35 \leq |\nu d1 - \nu d2| \quad (3)$$

where Nd1 is a refractive index of the positive lens piece of the cemented doublet lens, Nd2 is the refractive index of the negative lens piece of the cemented doublet lens, vd1 is an Abbe number of the positive lens piece of the cemented doublet lens, and vd2 is the Abbe number of the negative lens piece of the cemented doublet lens.

* * * * *